United States Patent
Teshima

(10) Patent No.: US 8,514,421 B2
(45) Date of Patent: Aug. 20, 2013

(54) APPARATUS FOR DETERMINING ALLOWABLE RECORDING DENSITY TO REDUCE IMAGE SHOW-THROUGH

(75) Inventor: Hideaki Teshima, Tokoname (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 831 days.

(21) Appl. No.: 12/579,827

(22) Filed: Oct. 15, 2009

(65) Prior Publication Data

US 2010/0110470 A1 May 6, 2010

(30) Foreign Application Priority Data

Oct. 31, 2008 (JP) ................................. 2008-282072

(51) Int. Cl.
*G06K 15/00* (2006.01)

(52) U.S. Cl.
USPC ........... 358/1.14; 347/104; 347/19; 358/1.13; 382/167

(58) Field of Classification Search
USPC ........ 358/1.14, 1.13, 1.2; 101/365; 347/104, 347/19; 382/162, 167, 270
See application file for complete search history.

(56) References Cited

U.S. PATENT DOCUMENTS

| | | | |
|---|---|---|---|
| 5,596,353 A | 1/1997 | Takada et al. | |
| 5,736,996 A | 4/1998 | Takada et al. | |
| 5,917,511 A | 6/1999 | Ueda | |
| 6,616,262 B2 * | 9/2003 | Nakajima et al. | 347/19 |
| 2001/0018875 A1 * | 9/2001 | Shiki et al. | 101/365 |
| 2003/0117639 A1 * | 6/2003 | Milton et al. | 358/1.13 |
| 2003/0164955 A1 * | 9/2003 | Vinas et al. | 358/1.2 |
| 2006/0221165 A1 * | 10/2006 | Kato | 347/104 |

FOREIGN PATENT DOCUMENTS

JP H03-295675 A 12/1991

(Continued)

OTHER PUBLICATIONS

Japan Patent Office; Notification of Reason for Refusal in Japanese Patent Application No. 2008-282072 (counterpart to the above-captioned U.S. Appl. No.) mailed on Aug. 31, 2010.

(Continued)

*Primary Examiner* — King Poon
*Assistant Examiner* — David S Cammack
(74) *Attorney, Agent, or Firm* — Baker Botts L.L.P.

(57) ABSTRACT

An image recording apparatus including: a head; a feeding mechanism; an image reading portion; a test recording controller which controls the head such that a test pattern is recorded on a first area of a first surface of a recording medium and is recorded on a second area of a second surface of the medium; a test pattern reading section which reads the test patterns recorded on the first area and the second area respectively from the second surface and the first surface; a determining section which determines allowable recording densities for the first surface and the second surface; and an image recording controller which controls the head such that, in a two-sided recording, the images are recorded on the first and second surfaces at respective densities equal to or lower than the allowable recording densities respectively for the first and second surfaces.

17 Claims, 12 Drawing Sheets

(56) References Cited

FOREIGN PATENT DOCUMENTS

| JP | H04-018356 A | | 1/1992 |
|----|---|---|---|
| JP | H08-310013 A | | 11/1996 |
| JP | 2002-192815 A | | 7/2002 |
| JP | 2004-106239 A | | 4/2004 |
| JP | 2006015679 A | * | 1/2006 |
| JP | 2007-130924 A | | 5/2007 |
| JP | 2007-152793 A | | 6/2007 |
| JP | 2008-093851 A | | 4/2008 |

OTHER PUBLICATIONS

Japan Patent Office, Notification of Reason for Refusal for Japanese Patent Application No. 2008-282072 (counterpart to above-captioned patent application), mailed Dec. 7, 2010.

Japan Patent Office, Decision of Refusal for Japanese Patent Application No. 2008-282072 (counterpart to above-captioned patent application), dispatched Mar. 1, 2011.

* cited by examiner

FEEDING DIRECTION

APPARATUS FOR DETERMINING ALLOWABLE RECORDING DENSITY TO REDUCE IMAGE SHOW-THROUGH

CROSS REFERENCE TO RELATED APPLICATION

The present application claims priority from Japanese Patent Application No. 2008-282072, which was filed on Oct. 31, 2008, the disclosure of which is herein incorporated by reference in its entirety.

BACKGROUND OF THE INVENTION

1. Field of the Invention

The present invention relates to an image recording apparatus and particularly to an image recording apparatus which can perform two-sided recording.

2. Description of the Related Art

In an ink-jet recording apparatus, where an image is recorded on each of both surfaces of a sheet as a recording medium, the ink adhering to a recorded surface is soaked into the sheet, whereby there may be caused a phenomenon known as what is called a strike-through (see-through, print-through) in which the ink can be transparently seen from a non-recorded surface. There is conventionally a technique in which a recording profile is recorded in advance on one of surfaces to measure a strike-through density of the surface, and a density of the ink to be ejected (hereinafter may be referred to as an ink-ejected density) is adjusted in the two-sided recording in order not to cause the strike-through. In this technique, since the ink is actually ejected, and the ink-ejected density is adjusted so as to prevent the strike-through of the ink, it is possible to perform recording at an ink-ejected density which would satisfy a user.

SUMMARY OF THE INVENTION

A sheet used for recording often has a front surface and a back surface whose properties (e.g., easiness of soakage of an ink) are different from each other. Thus, where images are respectively recorded on both surfaces of the sheet at the same density, even if an image recorded on one of the surfaces is not seen from the other of the surfaces, an image recorded on the other surface may be seen from the one surface. In the above-described conventional technique, an ink-ejected density which can prevent the strike-through for only one of the surfaces of the sheet is determined. Thus, when the two-sided recording is performed, it cannot be assured that the strike-through is not caused for each of the surfaces.

This invention has been developed in view of the above-described situations, and it is an object of the present invention to provide an image recording apparatus configured to restrain a strike-through for each of surfaces of a sheet in two-sided recording.

The object indicated above may be achieved according to the present invention which provides an image recording apparatus configured to respectively record images on opposite surfaces of a recording medium having a sheet-like shape, comprising: a recording head configured to record an image on the recording medium; a feeding mechanism configured to feed the recording medium such that after the recording medium has passed through a position facing to the recording head in a state in which a first surface of the recording medium faces toward the recording head, the recording medium passes through the position facing to the recording head in a state in which a second surface of the recording medium opposite to the first surface faces toward the recording head; an image reading portion configured to read the image recorded on the recording medium; a test recording controller configured to control the recording head such that a test pattern including a plurality of test recording areas whose densities are different from each other is recorded on a first area which is a part of the first surface of the recording medium, and a test pattern including a plurality of test recording areas whose densities are different from each other is recorded on a second area which is a part of the second surface of the recording medium and which is an area other than a first-area corresponding area as a part of the second surface, the part corresponding to the first area of the first surface; a test pattern reading section configured to read the test pattern recorded on the first area from the second surface by controlling the feeding mechanism such that the first-area corresponding area of the second surface faces to the image reading portion, and configured to read the test pattern recorded on the second area from the first surface by controlling the feeding mechanism such that a second-area corresponding area as a part of the first surface which corresponds to the second area of the second surface faces to the image reading portion; a determining section configured to determine an allowable recording density of a recording density for the first surface and an allowable recording density of a recording density for the second surface on the basis of a read value indicating the density relating to the first area which has been read by the test pattern reading section and a read value indicating the density relating to the second area which has been read by the test pattern reading section; and an image recording controller configured to control the recording head such that where the images are respectively recorded on the opposite surfaces of the recording medium, the image is recorded on the first surface at a density equal to or lower than the allowable recording density for the first surface and the image is recorded on the second surface at a density equal to or lower than the allowable recording density for the second surface.

BRIEF DESCRIPTION OF THE DRAWINGS

The objects, features, advantages, and technical and industrial significance of the present invention will be better understood by reading the following detailed description of an embodiment of the invention, when considered in connection with the accompanying drawings, in which.

DESCRIPTION OF THE EMBODIMENT

Hereinafter, there will be described an embodiment of the present invention by reference to the drawings.

Figure 1:
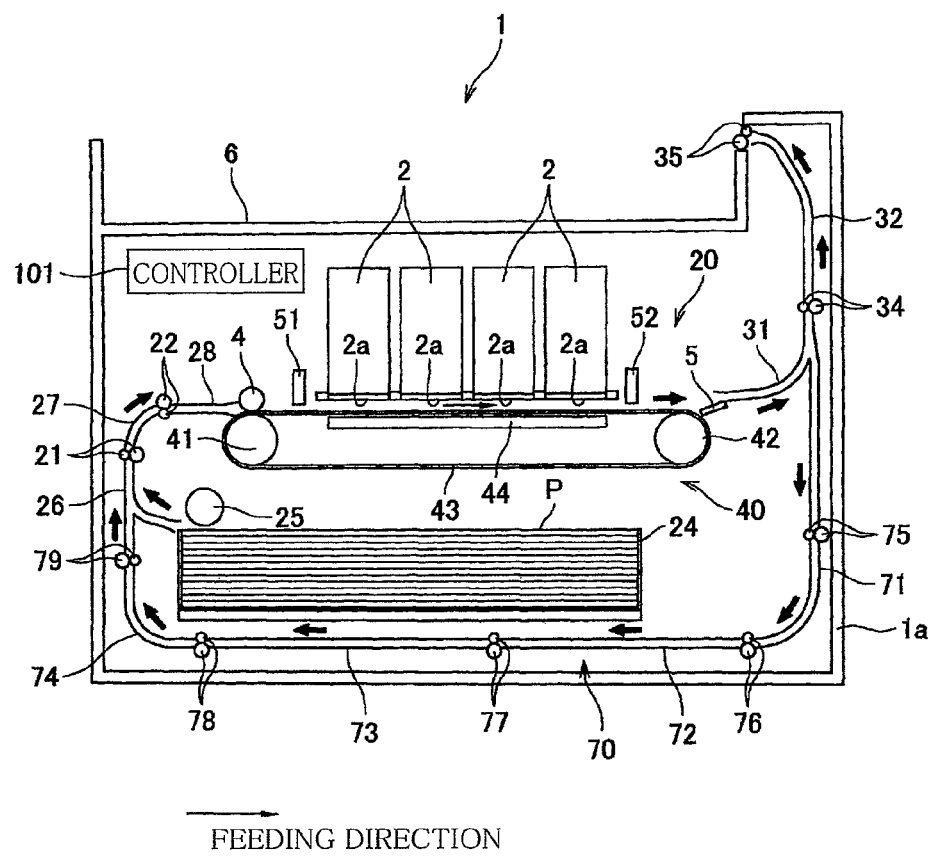
FIG. 1 is a side view of an inside of an ink-jet printer which is an image recording apparatus as an embodiment of the present invention.
Figure 2:
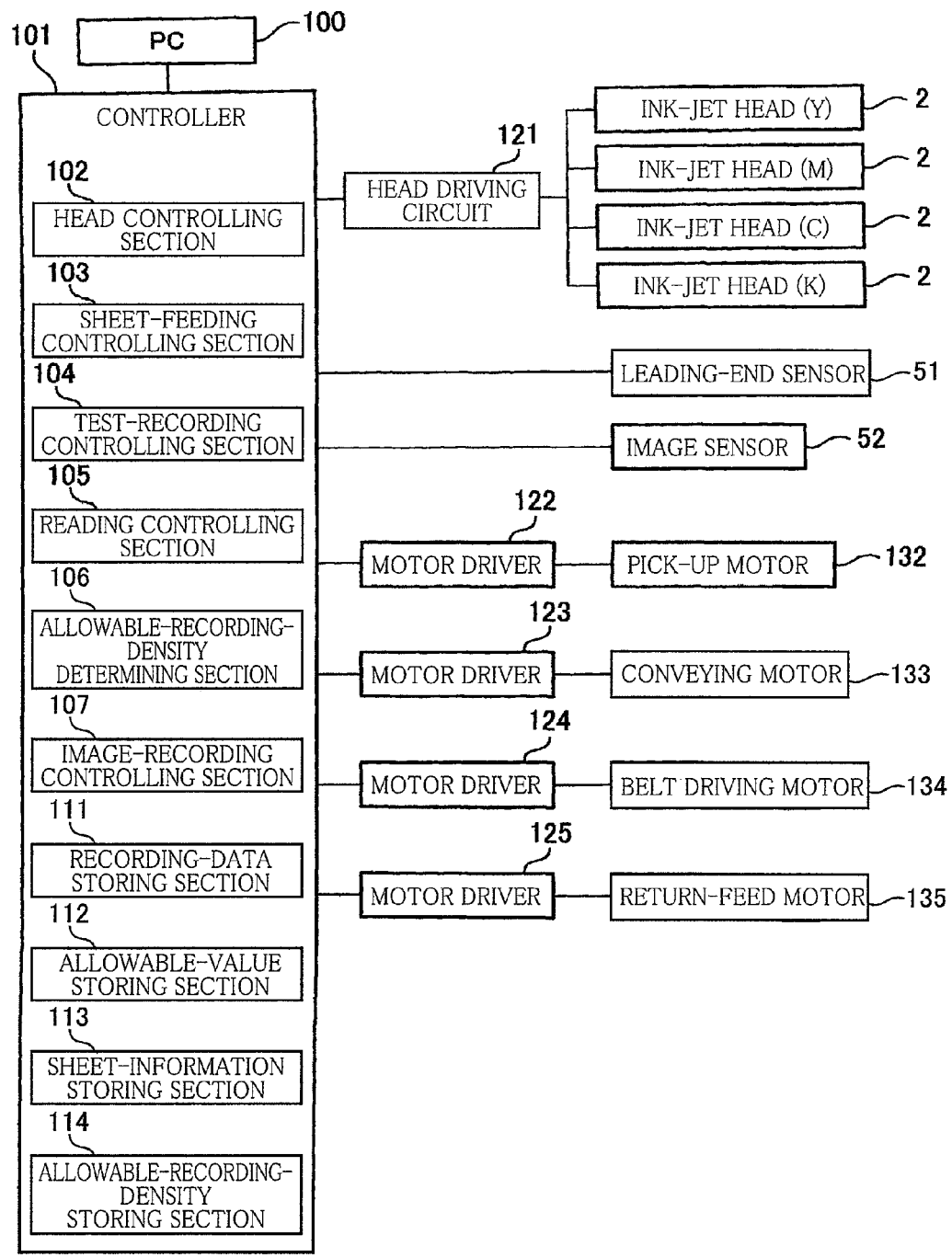
FIG. 2 is a block diagram of the ink-jet printer shown in FIG. 1.

As shown in FIG. 1, an ink-jet printer 1 as a recording apparatus includes a casing 1a having a rectangular parallelepiped shape. A sheet-discharge recessed portion 6 is provided on an upper surface of the casing 1a. In the casing 1a are disposed (a) a controller 101 for controlling an operation of the printer 1 and (b) four ink-jet heads 2 configured to respectively eject inks of four different colors, i.e., cyan, magenta, yellow, and black. As shown in FIG. 2, the controller 101 is connected to a personal computer (PC) 100. Each of the heads 2 is driven by a head driving circuit 121. A lower surface of each head 2 functions as an ink-ejection surface 2a in which are formed a plurality of ejection openings through which the ink is ejected. Below the four heads 2, there is disposed a sheet-feed unit 40 configured to feed a sheet P as a recording medium in a feeding direction directed from the left side toward the right side in FIG. 1. Further, below the sheet-feed unit 40, there is disposed a sheet-supply cassette 24 which can accommodate a plurality of the sheets P in a stacked state.

In the casing 1a, there are disposed a pick-up roller 25, a pressing roller 4, the sheet-feed unit 40, sheet-feed guides 26-28, 31, 32, 71-74, pairs of sheet rollers 21, 22, 34, 35, 75-79, and so on, whereby a sheet-feed path 20 and a return path 70 are formed. The sheet P is fed from the sheet-supply cassette 24 to the sheet-discharge recessed portion 6 via the sheet-feed path 20. The return path 70 is configured such that the sheet P fed by the sheet-feed unit 40 can be fed again to the sheet-feed unit 40 such that a surface of the sheet P which faces to the respective ink-ejection surfaces 2a of the four heads 2 is different from (i.e., reverse to) a surface of the sheet P which is fed by the sheet-feed unit 40 last time. The return path 70 is branched from the sheet-feed path 20 on a downstream side of the four heads 2 (specifically, at the sheet-feed guide 31), then passed below the sheet-supply cassette 24, and finally merges with the sheet-feed path 20 at a position between a sheet-supply portion of the sheet-supply cassette 24 and the four heads 2 (specifically, at the sheet-feed guide 26).

An uppermost one of the plurality of the sheets P accommodated in the sheet-supply cassette 24 is supplied by the pick-up roller 25. The pick-up roller 25 is rotated by a pick-up motor 132. The pick-up motor 132 is driven by a motor driver 122. The sheet P supplied from the sheet-supply cassette 24 by the rotation of the pick-up roller 25 is fed to the sheet-feed unit 40 by the two pairs of sheet rollers 21, 22 while being guided by the three sheet-feed guides 26, 27, 28. One of each pair of sheet rollers 21, 22 is a drive roller which is rotated by driving of a conveying motor 133 controlled by the controller 101, and the other roller is a driven roller which is rotated with the rotation of the one roller. The conveying motor 133 is driven by a motor driver 123.

The sheet-feed unit 40 includes (a) two belt-rollers 41, 42 which are parallel to each other and (b) an endless sheet-feed belt 43 as a supporting member which is bridged between the rollers 41, 42. The belt-roller 42 is rotated by a belt driving motor 134. The belt driving motor 134 is driven by a motor driver 124.

The sheet P supplied from the sheet-feed guide 28 is placed on the sheet-feed belt 43 as the supporting member of the sheet P. On an outer surface of the sheet-feed belt 43 is formed a silicone layer having a weak viscosity. The sheet P fed to the sheet-feed unit 40 is pressed onto the outer surface of the sheet-feed belt 43 by the pressing roller 4 disposed on the belt-roller 41. Then, the sheet P is held by the sheet-feed belt 43 with the viscosity of the silicone layer. The sheet-feed unit 40 feeds the sheet P in the feeding direction in accordance with the driving of the belt driving motor 134 such that one of the surfaces of the sheet P placed on the sheet-feed belt 43 successively faces the four heads 2. When the sheet P is passed below the heads 2, the inks of the respective four colors are ejected from the respective heads 2 to the sheet P, whereby a desired color image is formed on the sheet P.

A flat platen 44 formed of insulating resin is disposed at an area surrounded with the sheet-feed belt 43 and facing to the four heads 2. The flat platen 44 is a member which ensures a flatness of the sheet P in recording.

A leading-end sensor 51 is disposed between the pair of sheet rollers 22 and one of the ink-jet heads 2 which is located on the most upstream side among the heads 2. The leading-end sensor 51 is an optical sensor of reflective type or transmission type, for example. The leading-end sensor 51 outputs a leading-end sensing signal indicating that a leading end of the sheet P placed on the sheet-feed belt 43 has reached a position under the leading-end sensor 51. The leading-end sensing signal is supplied to the controller 101.

An image sensor 52 of line type longer than a width of the sheet P is disposed on a slightly downstream side of one of the heads 2 which is located on the most downstream side among the heads 2. The image sensor 52 is provided by a CCD (Charge Coupled Device) image sensor, for example. The image sensor 52 reads the image recorded on the sheet P, that is, performs an image-pickup operation, and converts an optical signal relating to the image to the electric signal to output the electric signal.

A peeling plate 5 is provided on an immediately downstream side of the sheet-feed unit 40 in the feeding direction. A distal end of the peeling plate 5 enters into between the sheet P and the sheet-feed belt 43, whereby the peeling plate 5 peels the sheet P from the sheet-feed belt 43.

The sheet P peeled from the sheet-feed belt 43 by the peeling plate 5 is fed upward by the pair of sheet rollers 34, 35 while being guided by the sheet-feed guides 31, 32, and then discharged onto the sheet-discharge recessed portion 6. One of each pair of sheet rollers 34, 35 is a drive roller which is rotated by driving of the conveying motor 133, and the other roller is a driven roller which is rotated with the rotation of the one roller.

The one drive roller of each pair of sheet rollers 34, 35 is rotatable forwardly and reversely. Thus, after a trailing end of the sheet P fed from the sheet-feed unit 40 is passed through the branched position of the sheet-feed path and the return path 70, the pair of sheet rollers 34, 35 are rotated reversely, whereby the sheet P can be moved backward or switched back. The sheet P having switched back is fed to the return path 70.

The return path 70 is constituted by the four sheet-feed guides 71, 72, 73, 74, and the five pairs of sheet rollers 75, 76, 77, 78, 79. In the return path 70, the sheet P is fed by the pairs of sheet rollers 75, 76, 77, 78, 79 while being guided by the sheet-feed guides 71, 72, 73, 74. One of each pair of sheet rollers 75, 76, 77, 78, 79 is a drive roller which is rotated by driving of a return-feed motor 135, and the other roller is a driven roller which is rotated with the rotation of the one roller. The return-feed motor 135 is driven by a motor driver 125.

The sheet P having been passed through the return path 70 and fed into the sheet-feed path 20 at the sheet-feed guide 26 is fed by the sheet-feed unit 40 and passed through the position below the four heads 2 in a state in which the surface of the sheet P which faces to the respective ink-ejection surfaces 2a of the four heads 2 is different from or reverse to the surface of the sheet P which is fed by the sheet-feed unit 40 last time.

In this embodiment, the pick-up roller 25, the pressing roller 4, the sheet-feed guides 26, 27, 28, 31, 32, 71-74, the pairs of sheet rollers 21, 22, 34, 35, 75-79, the sheet-feed unit 40, the pick-up motor 132, the conveying motor 133, the belt driving motor 134, the return-feed motor 135, and the motor drivers 122-125 constitute a feeding mechanism. The feeding mechanism is not limited to have the above-described construction. That is, the feeding mechanism may have any construction as long as the sheet P can be fed such that after the sheet P is passed through the position facing to the heads 2 with the one surface facing to the heads 2, the sheet P is passed through the position facing to the heads 2 with the other surface facing to the heads 2.

There will be explained the controller 101 in detail. The controller 101 includes a Central Processing Unit (CPU), an Electrically Erasable and Programmable Read Only Memory (EEPROM) rewritably storing programs executed by the CPU and data used when these programs are executed, and a Random Access Memory (RAM) for temporarily storing data during execution of the programs. These pieces of hardware and software in the EEPROM are cooperated with each other, whereby the controller 101 functions as a head controlling section 102, a sheet-feeding controlling section 103, a test-recording controlling section 104, a reading controlling section 105, an allowable-recording-density determining section 106, an image-recording controlling section 107, a recording-data storing section 111, an allowable-value storing section 112, a sheet-information storing section 113, an allowable-recording-density storing section 114, and so on.

Further, the ink-jet printer 1 as the present embodiment is operated in one of a normal recording mode (including two-sided recording and one-sided recording) and an allowable recording density determining mode which will be described below in accordance with an operation of the printer 1 or the PC 100 by a user. The two-sided recording in the normal recording mode includes two operating modes, i.e., a density adjusting mode and a density non-adjusting mode. Whether a current operating mode of the printer 1 is the density adjusting mode or the density non-adjusting mode is stored into the PC 100 or the printer 1 in accordance with the operation of the printer 1 or the PC 100 by the user.

Figure 6:
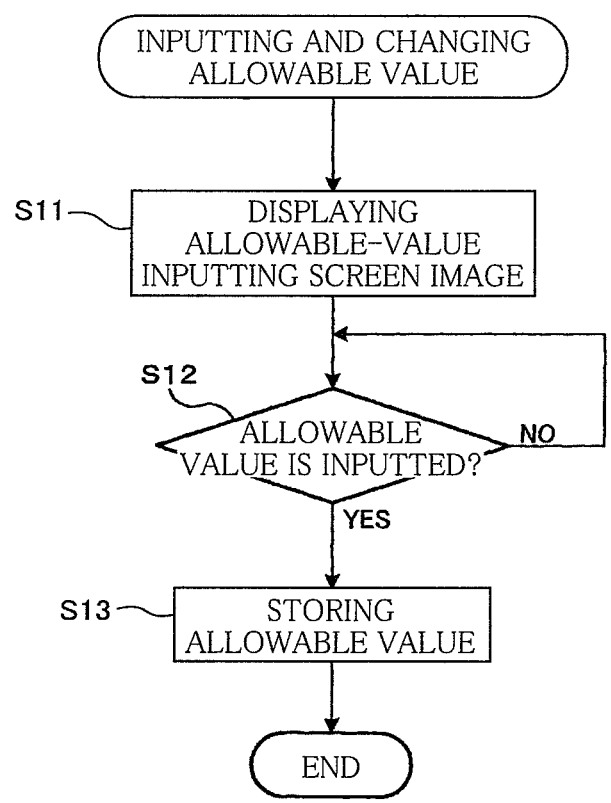
FIG. 6 is a flow-chart indicating a processing of the ink-jet printer shown in FIG. 1 for inputting and changing an allowable value Ds.

The recording-data storing section 111 stores recording data which is transmitted from the PC 100 and which relates to an image to be formed on the sheet P. The allowable-value storing section 112 stores an allowable value Ds of a density relating to strike-through (see-through, print-through) of the image recorded on the sheet P. The allowable value Ds is used as a parameter of a calculation relating to a determination of an allowable recording density by the allowable-recording-density determining section 106. The allowable value Ds is any density value designated by the user, and in the present embodiment, the allowable value Ds is set to one numeric value selected from a number of levels of gradation greater than 10 (e.g., 256 levels of gradation). With reference to FIG. 6, the allowable value Ds stored in the allowable-value storing section 112 is rewritable by the operation of the printer 1 or the PC 100 by the user.

The head controlling section 102 controls the head driving circuit 121 such that the inks are respectively ejected from the ink-jet heads 2 at desired timings on the basis of the recording data stored in the recording-data storing section 111.

In the one-sided recording in the normal recording mode, the sheet-feeding controlling section 103 controls the motor drivers 122-124 so as to cause the sheet P to be fed through the sheet-feed path 20 and discharged onto the sheet-discharge recessed portion 6 at a desired timing. Further, in the two-sided recording in the normal recording mode, the sheet-feeding controlling section 103 controls the motor drivers 122-125 so as to cause the sheet P to be fed through the sheet-feed path 20, the return path 70, and the sheet-feed path 20 in order (that is, the sheet P is fed through the position below the four heads 2 twice) and discharged onto the sheet-discharge recessed portion 6 at a desired timing. Furthermore, in the allowable recording density determining mode, the sheet-feeding controlling section 103 controls the motor drivers 122-125 so as to cause the sheet P to be fed through the sheet-feed path 20, the return path 70, the sheet-feed path 20, the return path 70, and the sheet-feed path 20 in order (that is, the sheet P is fed through the position below the four heads 2 three times) and discharged onto the sheet-discharge recessed portion 6 at a desired timing.

Figure 3:
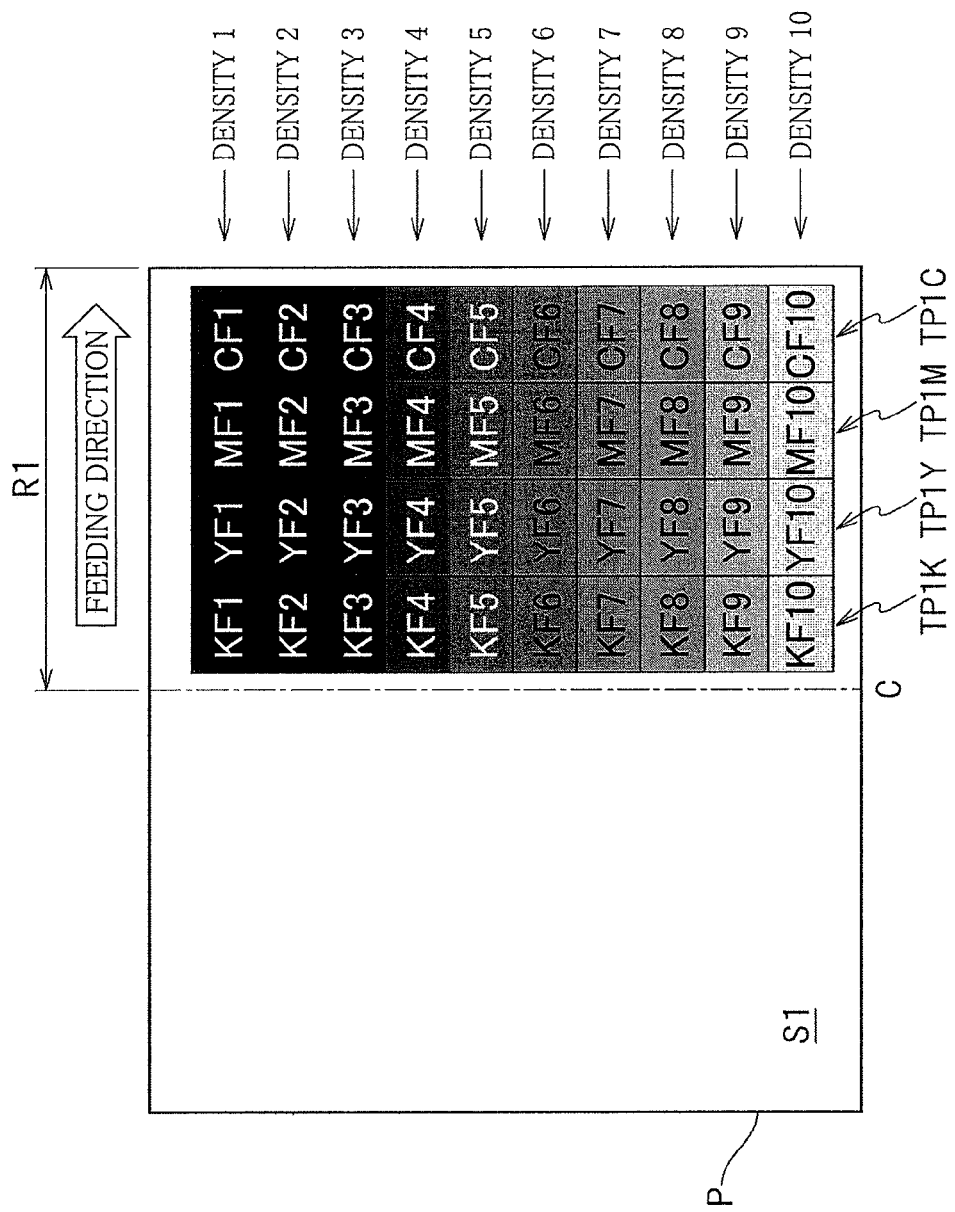
FIG. 3 is a view showing a state in which test patterns of respective four colors are formed in a first feeding on an area of a sheet expanding from a leading end of a first surface of the sheet to a center of the sheet in a feeding direction.
Figure 4:
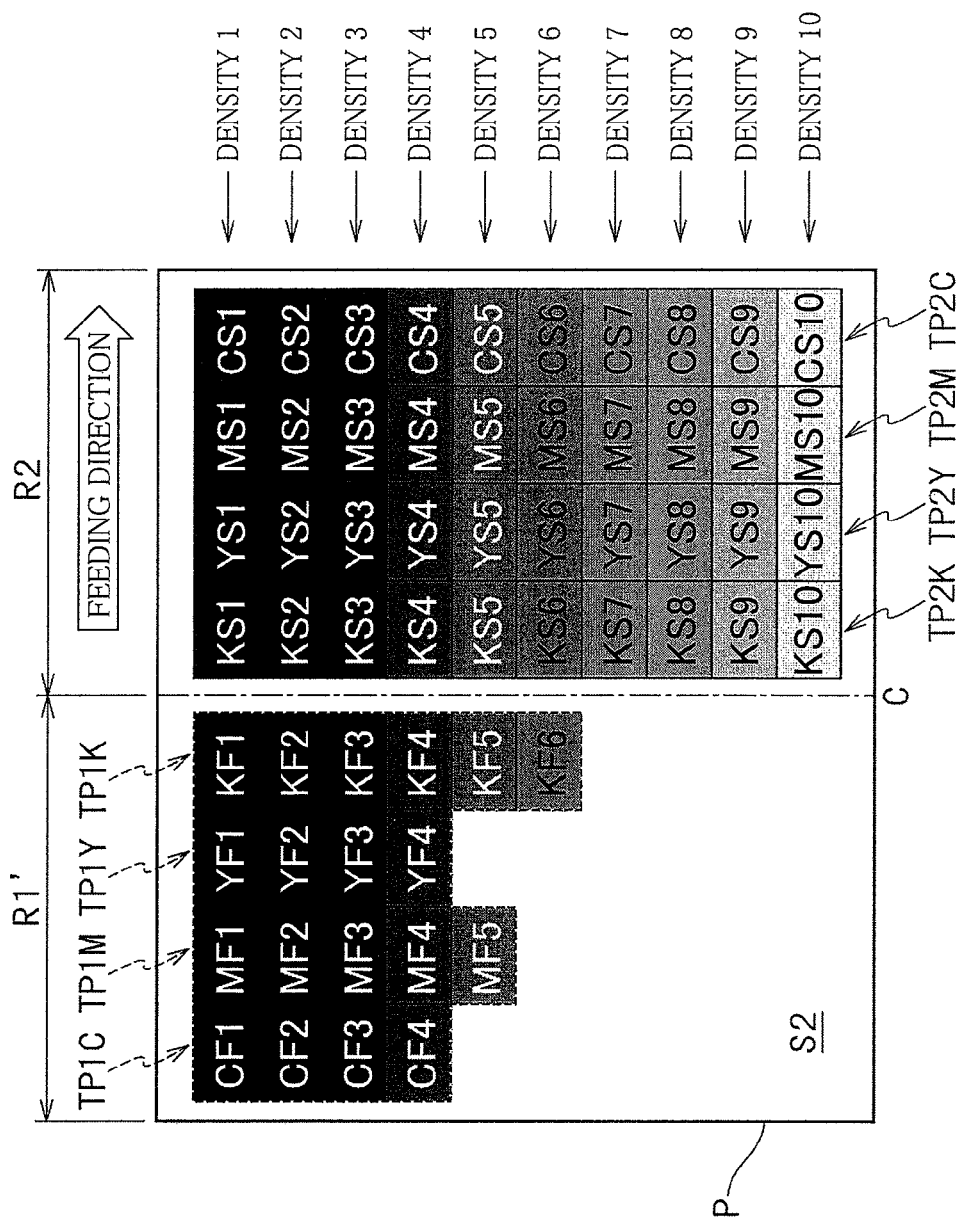
FIG. 4 is a view showing a state in which the test patterns of the respective four colors are formed in a second feeding on an area of the sheet expanding from a leading end of a second surface of the sheet to a center of the sheet in the feeding direction.

The test-recording controlling section 104 controls the four heads 2 via the head driving circuit 121 such that four test patterns (profiles) of different colors are recorded on a generally half area of the sheet P in the allowable recording density determining mode. In the present embodiment, each of the test patterns is constituted by ten rectangular test recording areas arranged in a row in a direction perpendicular to the feeding direction such that a density of a corresponding one of the colors becomes gradually higher. The four test patterns respectively have cyan, magenta, yellow, and black. With reference to FIG. 3, these four test patterns are arranged in the feeding direction. That is, forty test recording areas are formed in the four test patterns. A length of the four test patterns in the feeding direction is about half of that of the sheet P. The four test patterns are recorded on the sheet P within an area thereof expanding from the leading end thereof to a center of the sheet P in the feeding direction. More specifically, when the sheet P is fed by the sheet-feed belt 43 for the first time, as shown in FIG. 3, the test-recording controlling section 104 controls the four heads 2 via the head driving circuit 121 such that four test patterns TP1C, TP1M, TP1Y, TP1K are recorded, using respective initials of the four colors (C, M, Y, K) as labels, on an area (a first area) R1 of a first surface S1 of the sheet P (i.e., a surface of the sheet P which faces to the heads 2 when the sheet P is fed by the sheet-feed belt 43 for the first time), which area R1 is an area which expands from the leading end of the sheet P to the center of the sheet P in the feeding direction. Further, when the sheet P is fed by the sheet-feed belt 43 for the second time, as shown in FIG. 4, the test-recording controlling section 104 controls the four heads 2 via the head driving circuit 121 such that four test patterns TP2C, TP2M, TP2Y, TP2K are recorded on an area (a second area) R2 of a second surface S2 of the sheet P (i.e., a surface of the sheet P which faces to the heads 2 when the sheet P is fed by the sheet-feed belt 43 for the second time), which area R2 is an area which expands from the leading end of the sheet P to the center of the sheet P in the feeding direction. The first surface S1 and the second surfaces S2 are opposite to each other. The second area R2 of the second surface S2 does not overlap or is not opposite to the first area R1 of the first surface S1 in a direction perpendicular to the surface of the sheet P. The four test patterns TP1C, TP1M, TP1Y, TP1K and the four test patterns TP2C, TP2M, TP2Y, TP2K are disposed so as to be axisymmetric (line symmetric) with each other with respect to a central axis C of the sheet P which extends in the direction perpendicular to the feeding direction. Further, the same-colored two of the test patterns which are formed in different areas are also disposed so as to be axisymmetric with each other with respect to the central axis C.

It is noted that, in FIG. 4, an area of the second surface S2 of the sheet P which is other than the area R2 refers to an area R1' (a first-area corresponding area). The area R1' is an area of the second surface of the sheet P and is located at a reversed or back area of the area R1 of the first surface S1 of the sheet P. That is, the area R1 and the area R1' are opposite to each other. Likewise, in FIG. 5, an area of the first surface S1 of the sheet P which is other than the area R1 refers to an area R2' (a second-area corresponding area). The area R2' is an area of the first surface of the sheet P and is located at a reversed or back area of the area R2 of the second surface S2 of the sheet P. That is, the area R2 and the area R2' are opposite to each other.

Figure 5:
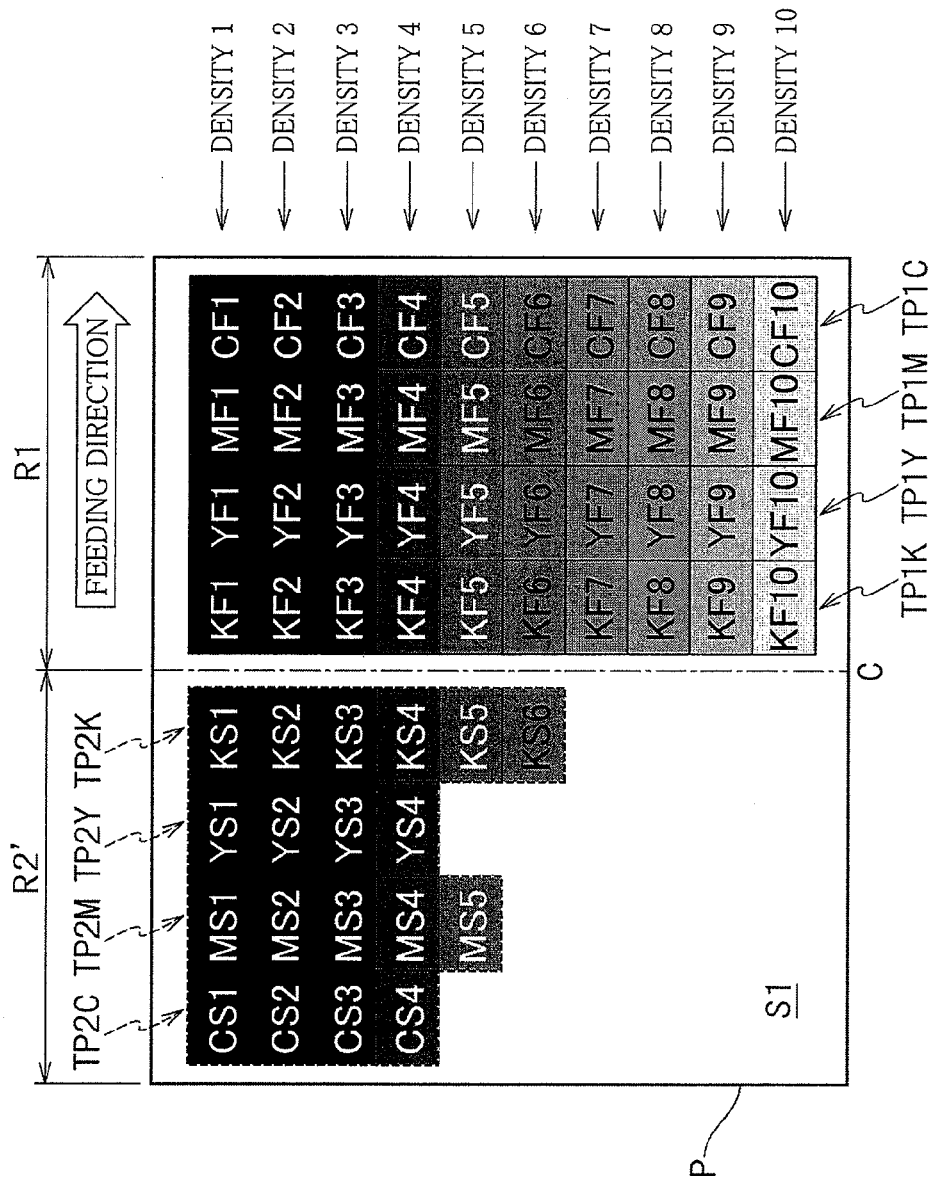
FIG. 5 is a view showing a state of the sheet in a third feeding.

In FIGS. 3-5, eighty test recording areas formed on the sheet P are distinguished and expressed using the respective initials of the colors (C, M, Y, K), distinguishing of the front side and the reverse side (F, S), and density numbers (1-10) as labels. It is noted that the density becomes low in accordance that the density number increases. In figures, "MF4" means a test recording area in which a color formed on the first surface is magenta, and the density number is 4, while "KS9" means a test recording area in which a color formed on the second surface is black, and the density number is 9, for example. It is noted that the density numbers 1-10 may be set in correspondence with densities obtained by dividing densities ranging from a density (the highest density) of a test recording area covered (solidly shaded) with the ink without any space to a density (the lowest density) of a test recording area to which no ink adheres, into ten levels spaced evenly or at any individually set intervals. Further, the density numbers 1-10 may be set in correspondence with densities obtained by dividing any density section or segment between the highest density and the lowest density into ten levels spaced evenly or at any individually set intervals.

In the allowable recording density determining mode, the reading controlling section 105 controls the image sensor 52 such that the four test patterns TP1C, TP1M, TP1Y, TP1K recorded on the first area R1 of the first surface S1 are read from the second surface S2 when the sheet P is fed by the sheet-feed belt 43 for the second time with reference to FIG. 4. Further, in the allowable recording density determining mode, the reading controlling section 105 controls the image sensor 52 such that the four test patterns TP2C, TP2M, TP2Y, TP2K recorded on the second area R2 of the second surface S2 are read from the first surface S1 when the sheet P is fed by the sheet-feed belt 43 for the third time with reference to FIG. 5.

As a result of the readings of the image sensor 52 twice, two pairs of forty measurement values (read values) of the respective densities are obtained in correspondence with the pair of the forty test recording areas formed on the sheet P. In the present embodiment, each of the forty measurement values is one value of the number of levels of gradation (e.g., 256 levels of gradation), which number is the same as the allowable value Ds.

On the basis of a comparison between the allowable value Ds stored in the allowable-value storing section 112 and at least one of the measurement values of the respective densities (one or ones of the measurement values of the respective densities of the forty test recording areas in each surface) of the pair of the forty measurement values of the respective densities obtained by the reading of the image sensor 52, the allowable-recording-density determining section 106 separately determines, for each color, an allowable recording density Da1 for the first surface S1 and an allowable recording density Da2 for the second surface S2. The allowable recording density Da1 is set such that the measurement value of the density for each color which is obtained when the image recorded on the first surface S1 is read from the second surface S2 is equal to or lower than the allowable value Ds. The allowable recording density Da2 is set such that the measurement value of the density for each color which is obtained when the image recorded on the second surface S2 is read from the first surface S1 is equal to or lower than the allowable value Ds. Each of the allowable recording density Da1, Da2 for each color is a recording density which can prevent the strike-through of the ink of the color.

In the present embodiment, the allowable-recording-density determining section 106 determines, for each color, the allowable recording density Da1 and the allowable recording density Da2 as densities each corresponding to one of the density numbers 1-10. Specifically, each of the allowable recording density Da1 and the allowable recording density Da2 is the same as a density of one of the ten test recording areas of each test pattern for each color, which one has the measurement value indicating the highest density among the ten test recording areas, the value being equal to or lower than the allowable value Ds.

In the following explanation, eight allowable recording densities determined by the allowable-recording-density determining section 106 will be expressed as Da1C, Da2C, Da1M, Da2M, Da1Y, Da2Y, Da1K, and Da2K using the respective initials of the four colors (C, M, Y, K) as the labels. After the determination of the allowable recording density Da1 and the allowable recording density Da2, the allowable-recording-density determining section 106 determines an allowable recording density Dx1 and an allowable recording density Dx2 common for the four colors and respectively for the first surface S1 and the second surface S2. The common allowable recording density Dx1 for the first surface S1 is the lowest density among the allowable recording densities Da1C, Da1M, Da1Y, Da1K relating to the four colors. The common allowable recording density Dx2 for the second surface S2 is the lowest density among the allowable recording densities Da2C, Da2M, Da2Y, Da2K relating to the four colors.

When the operating mode of the printer 1 in the two-sided recording in the normal recording mode is the density adjusting mode, the image-recording controlling section 107 controls the recording of the image by the heads 2 such that a recording density of the image on the sheet P is lower than the common allowable recording densities Dx1, Dx2 determined respectively for the first surface S1 and the second surface S2. Specifically, the recording data stored in the recording-data storing section 111 is converted such that an ink ejection amount per a unit area on the sheet P becomes smaller, using a table representative of a relationship between a recording density of the image on the sheet P which is stored in the image-recording controlling section 107 and the ink ejection amount per the unit area.

The sheet-information storing section 113 stores a size or sizes of the sheet(s) P of one or a plurality of types in association with a registering number(s) (an identifying number(s)).

Figure 11:
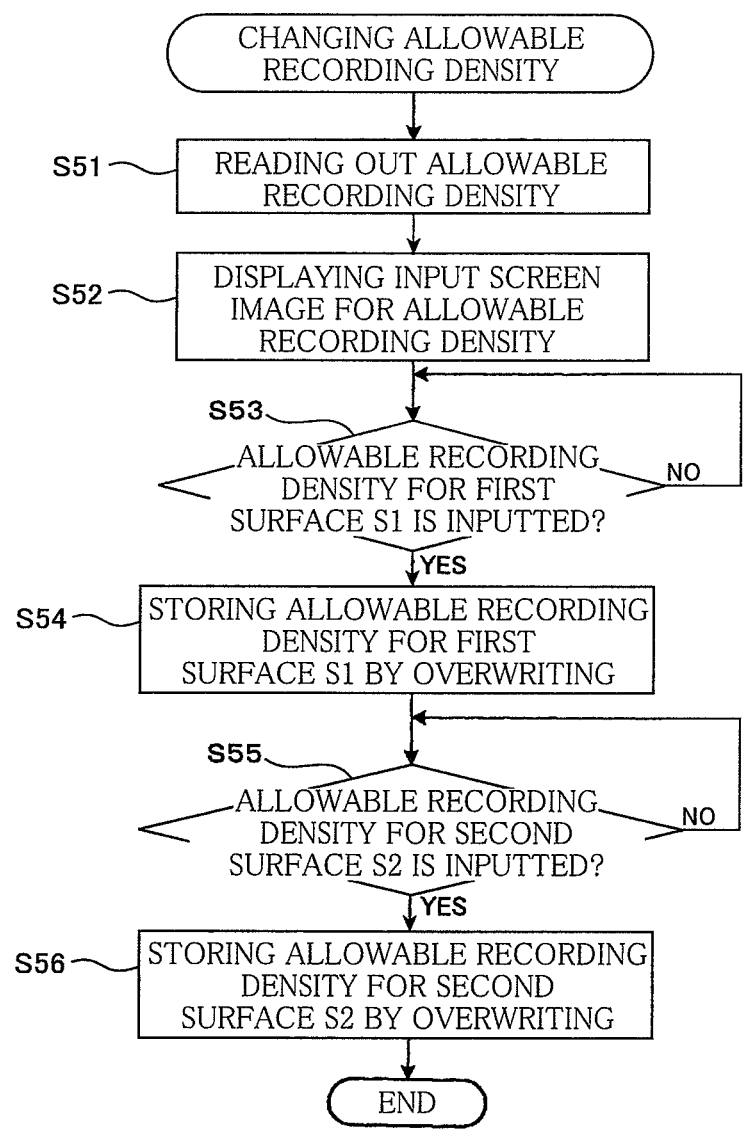
FIG. 11 is a flow-chart indicating a processing for changing the allowable recording densities.

The allowable-recording-density storing section 114 stores the common allowable recording density Dx1 and the common allowable recording density Dx2 in association with the identifying number(s) of the sheet(s) P of one or the plurality of types. That is, the allowable-recording-density storing section 114 stores an allowable recording density table in which the common allowable recording density Dx1 and the common allowable recording density Dx2 are associated with the respective types of the sheet P. With reference to FIG. 11, the common allowable recording density Dx1 and the common allowable recording density Dx2 stored in the allowable-recording-density storing section 114 are rewritable by the operation of the printer 1 or the PC 100 by the user.

There will be next explained a series of operations of the ink-jet printer 1 relating to the recording with reference to flow-charts indicated by FIGS. 6-12.

Initially, there will be explained a processing for inputting and changing the allowable value Ds with reference to FIG. 6. In S11, an allowable-value inputting screen image is displayed on a display (not shown) of the PC 100. This processing is performed by a control of a control device (including the CPU, the RAM, and so on) of the PC 100 on the basis of driver software of the printer 1 which is installed in the PC 100. In S12, the processing waits until the allowable value is inputted into an input field of the allowable-value inputting screen image using input devices of the PC 100 (e.g., a keyboard and a mouse). Then, where the allowable value is inputted (S12: YES), the inputted allowable value Ds is stored in S13 in the allowable-value storing section 112 by overwriting. It is noted that the printer 1 may be configured such that the user inputs the allowable value by operating operational buttons and a touch panel of the printer 1 in a state in which the allowable-value inputting screen image is displayed on a display (not shown) of the printer 1. It is noted that the printer 1 may be configured such that a predetermined value is stored in the allowable-value storing section 112 in advance, and the predetermined value is used as the allowable value as long as the input or a change of the allowable value is not performed by the user.

Figure 7:
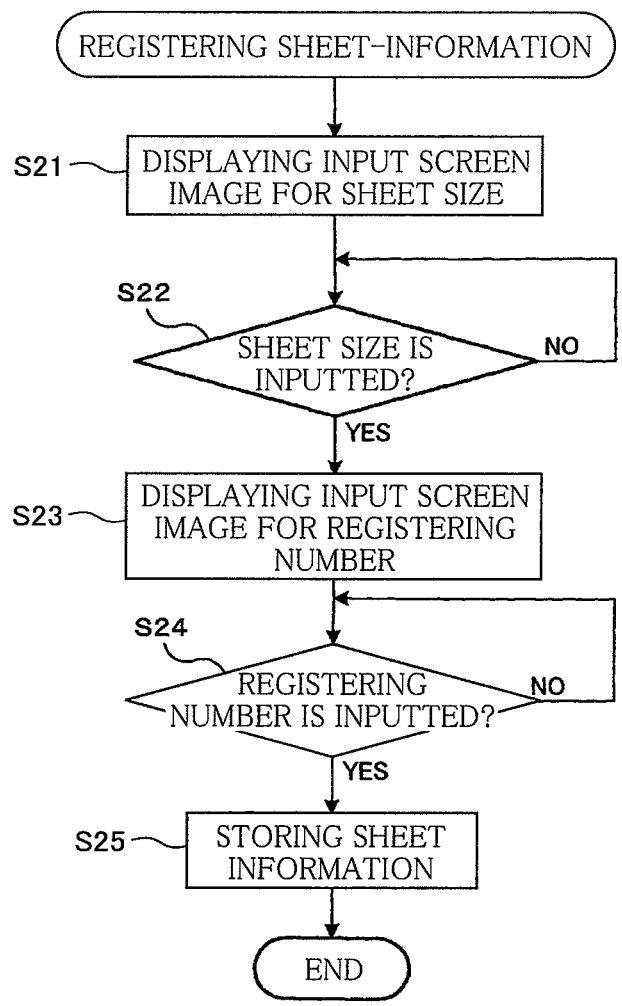
FIG. 7 is a flow-chart indicating a sheet-information registering processing.

There will be next explained a sheet-information registering processing with reference to FIG. 7. Initially, in S21, an input screen image for inputting the size (a length and a width) of the sheet P is displayed on the display of the PC 100 or the printer 1. In S22, the processing waits until the size of the sheet is inputted into an input field of the sheet-size inputting screen image using the input devices (e.g., the keyboard, the mouse, the buttons, the touch panel) of the PC 100 or the printer 1. Then, where the sheet size is inputted (S22: YES), an input screen image for inputting the registering number of the sheet P is displayed in S23 on the display of the PC 100 or the printer 1. In S24, the processing waits until the registering number is inputted into an input field of the registering-number inputting screen image using the input devices of the PC 100 or the printer 1. Then, where the registering number is inputted (S24: YES), the sheet size inputted in S22 is associated in S25 with the registering number inputted in S24 and stored in the sheet-information storing section 113 by overwriting. By repeating the above-described processings, the sizes of the sheets of the plurality of types can be stored into the sheet-information storing section 113 in association with the registering number. It is noted that, in addition to the size of the sheet, a weight (a density) per a unit area of the sheet may be stored as sheet information into the sheet-information storing section 113 in association with the registering number. Further, instead of or in addition to the weight per the unit area, the ink transmittancy of the sheet P may be stored into the sheet-information storing section 113 in association with the registering number.

Figure 8:
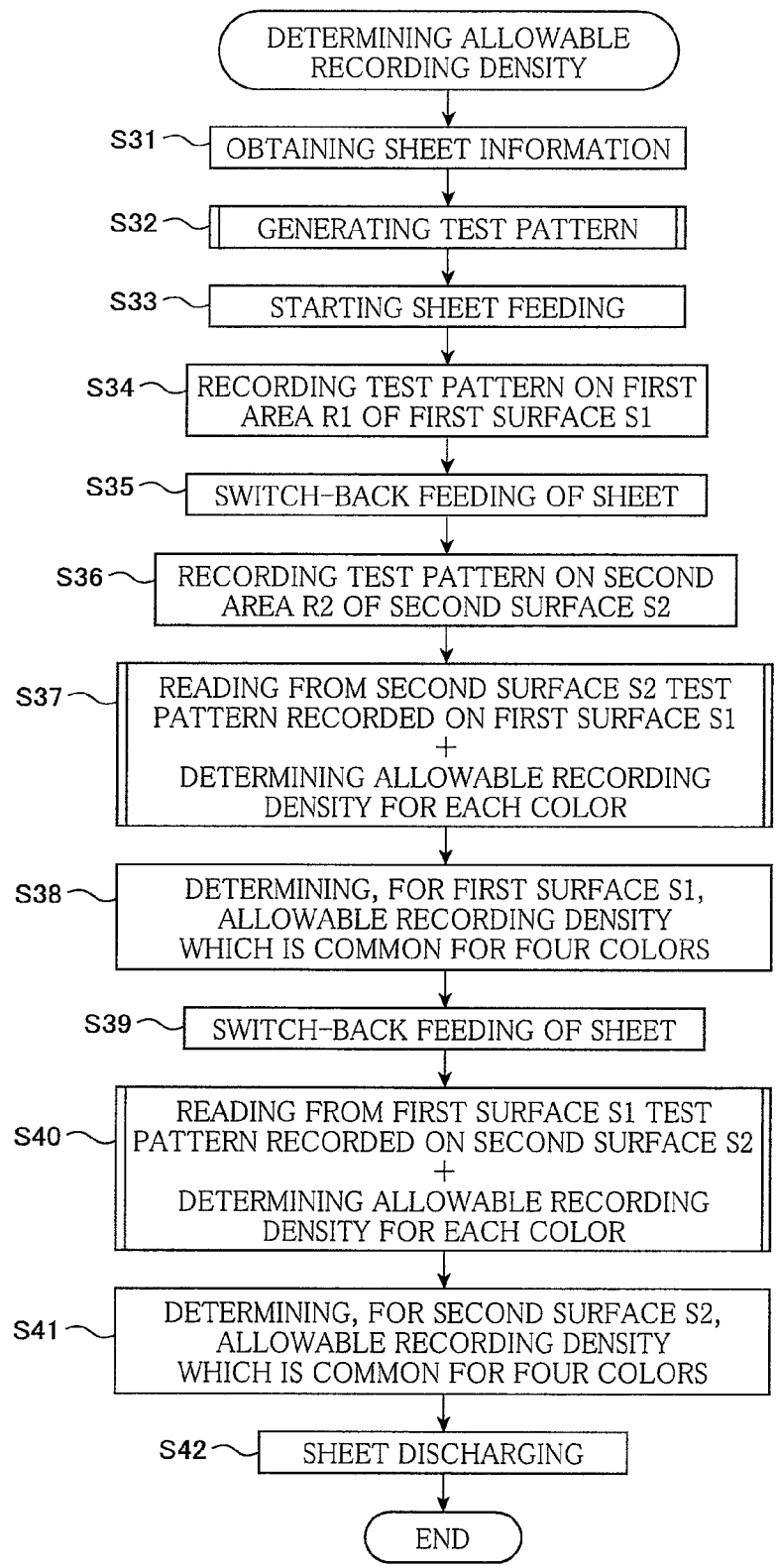
FIG. 8 is a flow-chart indicating a processing for determining a common allowable recording density Dx1 and a common allowable recording density Dx2, which processing is performed in an allowable recording density determining mode.

There will be next explained, with reference to FIG. 8, a processing for determining the common allowable recording density Dx1 and the common allowable recording density Dx2, which processing is performed in the allowable recording density determining mode. This processing may be performed at predetermined intervals and may be performed at each time when recording of a predetermined number of the sheets is finished. Initially, in S31, on the basis that the user inputs the registering number of the sheet by operating the input devices of the PC 100 or the printer 1, size information of the sheet P which is accommodated in the sheet-supply cassette 24 and which is to be subjected to the recording by the printer 1 is obtained from the sheet-information storing section 113. The size information to be obtained is stored in the sheet-information storing section 113 in association with the inputted registering number. Then, in S32, the four test patterns are generated.

Figure 9:
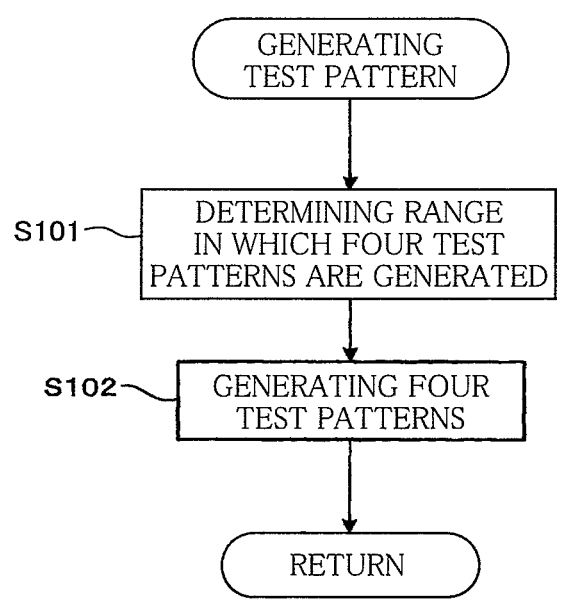
FIG. 9 is a flow-chart indicating a processing for generating the test patterns.

Here, there will be explained the processing for generating the test patterns with reference to FIG. 9. Initially, in S101, a range in which the four test patterns are generated or produced is determined. The recording range of the four test patterns is determined from the size of the sheet P which is obtained in S31. Specifically, the recording range of the four test patterns is determined such that a length thereof extending in the feeding direction is slightly smaller than a half of a length (a length of longer sides) of the sheet, and a width of the recording range extending in the direction perpendicular to the feeding direction is slightly smaller than a width (a length of shorter sides) of the sheet. Then, the determined recording range is divided in the feeding direction into four parts and divided in the direction perpendicular to the feeding direction into ten parts, thereby determining ranges of respective forty test recording areas.

Then, in S102, for each color, the density divided into ten levels evenly (or at any individually set intervals) from the highest density to the lowest density is assigned to the forty test recording areas determined in S102. In this time, the ten test recording areas of the same color are arranged such that the density of the color becomes gradually higher in the direction perpendicular to the feeding direction. Further, the test recording areas are arranged such that cyan, magenta, yellow, black are arranged in order in the feeding direction so as to be adjacent to each other. The four test patterns are generated in this manner.

It is noted that where the weight per the unit area or the ink transmittancy is associated with the registering number in the sheet-information storing section 113, the density numbers 1-10 may be given in correspondence with the density divided into ten levels evenly (or at any individually set intervals) from a first density equal to or lower than the highest density to a second density equal to or higher than the lowest density. The first density and the second density become higher in accordance that the weight per the unit area is large or the ink transmittancy is small. The first density and the second density become lower in accordance that the weight per the unit area is small or the ink transmittancy is large. Further, the printer 1 may be configured such that a temperature and/or a humidity sensor is or are provided in the printer 1, and the first density and the second density are determined taking into consideration a temperature and/or a humidity determined by the sensor(s). That is, since the ink is more likely to dry in accordance that the temperature is high or the humidity is low, the first density and the second density are set to lower densities in accordance that the temperature is high or the humidity is low. Further, since the ink is less likely to dry in accordance that the temperature is low or the humidity is high, the first density and the second density are set to higher densities in accordance that the temperature is low or the humidity is high.

Returning to FIG. 8, in S33, the sheet-feeding controlling section 103 controls the motor drivers 122, 123 to start the driving of the pick-up motor 132 and the conveying motor 133. As a result, the pick-up roller 25 and the pair of sheet rollers 21, 22 start to be rotated, whereby the sheet P is fed from the sheet-supply cassette 24 to the sheet-feed unit 40. This is a first feeding of the sheet P by the sheet-feed belt 43.

Then, in S34, the processing waits until the leading-end sensor 51 outputs the leading-end sensing signal. After the leading-end sensing signal is outputted, and then a predetermined time period (a value obtained by dividing a distance from the leading-end sensor 51 to the most upstream-side head 2 by a sheet feeding velocity by the sheet-feed belt 43) has passed, the head controlling section 102 controls the head driving circuit 121 to cause the heads 2 to respectively record the four test patterns TP1C, TP1M, TP1Y, TP1K on the sheet P. As explained with reference to FIG. 3, the test patterns TP1C, TP1M, TP1Y, TP1K are recorded on the first area R1 of the first surface S1 of the sheet P.

After the recording of the four test patterns TP1C, TP1M, TP1Y, TP1K is finished, the sheet P is switched back in S35. That is, after the trailing end of the sheet P fed from the sheet-feed unit 40 has passed through the branched position of the sheet-feed path and the return path 70, the pair of sheet rollers 34, 35 are reversely rotated, whereby the sheet P is fed to the return path 70. The sheet P fed through the return path 70 is fed into the sheet-feed path 20 at the sheet-feed guide 26. This is a second feeding of the sheet P by the sheet-feed belt 43.

The sheet P fed into the sheet-feed path 20 is passed through the position below the four heads 2 with the second surface S2 facing upward. Then, the processing waits until the leading-end sensor 51 outputs the leading-end sensing signal. After the leading-end sensing signal is outputted, and then the predetermined time period (the value obtained by dividing the distance from the leading-end sensor 51 to the most upstream-side head 2 by the sheet feeding velocity by the sheet-feed belt 43) has passed, the head controlling section 102 controls in S36 the head driving circuit 121 to cause the heads 2 to record the four test patterns TP1C, TP1M, TP1Y, TP1K on the sheet P. As explained with reference to FIG. 4, the four test patterns TP2C, TP2M, TP2Y, TP2K are recorded on the second area R2 (which is not opposed to the first area R1) of the second surface S2 of the sheet P.

In S37, the reading controlling section 105 controls the image sensor 52 to read from the second surface S2 the four test patterns TP1C, TP1M, TP1Y, TP1K recorded on the first area R1 of the first surface S1. That is, the reading controlling section 105 controls the sheet-feeding controlling section 103 such that the first-area corresponding area R1' of the second surface S2 is disposed at a position facing to the image sensor 52, and controls the image sensor 52 to be operated to read from the second surface S2 the four test patterns TP1C, TP1M, TP1Y, TP1K recorded on the first area R1 of the first surface S1. Then, for each color, the allowable-recording-density determining section 106 determines the allowable recording density for the first surface S1.

Figure 10:
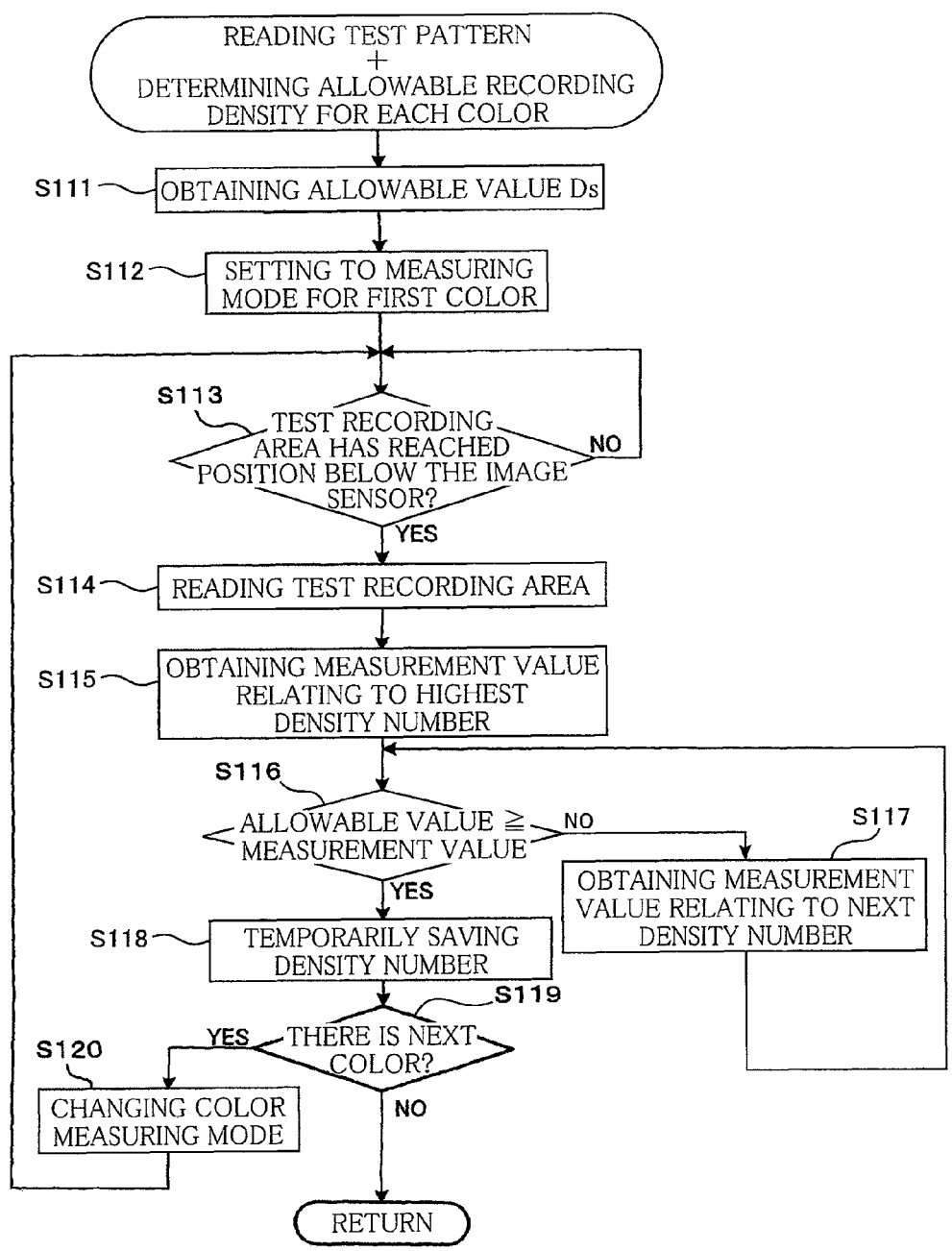
FIG. 10 is a flow-chart indicating a detail of a processing of S37 shown in FIG. 8.

Here, there will be explained the processing of S37 in detail with reference to FIG. 10. Initially, in S111, the allowable value Ds stored in the allowable-value storing section 112 is obtained. Next, in S112, the printer 1 is set to a setting mode for setting the test pattern TP1K relating to a first color (i.e., black) of the four test patterns TP1C, TP1M, TP1Y, TP1K. Specifically, the image sensor 52 is changed not to use the colored filter or the light source (i.e., changed to a state in which no colored filter and the light source are used).

Then, in S113, while the printer 1 continues the feeding of the sheet P, the processing waits until distal ends of the respective ten test recording areas relating to black, i.e., the first color in the test pattern TP1K (in a second and subsequent loops, one of yellow, magenta, cyan in turn) have reached the position below the image sensor 52. Whether the distal ends of the respective test recording areas have reached the position below the image sensor 52 or not is judged on the basis whether a predetermined time period (a value obtained by dividing, by the sheet feeding velocity by the sheet-feed belt 43, a distance obtained by adding a half length of the sheet P to a distance from the leading-end sensor 51 to the image sensor 52) has passed from the outputting of the leading-end sensing signal or not. Then, where the predetermined time period has passed from the outputting of the leading-end sensing signal (S113: YES), the processing goes to S114.

In S114, the reading controlling section 105 controls the image sensor 52 to read from the second surface S2 the ten test recording areas relating to the test pattern TP1K of the first color (in the second and subsequent loops, the one of yellow, magenta, cyan in turn) recorded on the first area R1 of the first surface S1. This reading allows the ten measurement values of the densities of the respective ten test recording areas to be obtained for one color.

In S115, the measurement value of the test recording area of the density number 1 having the highest density among the measurement values of the respective ten densities obtained in S114. Then, in S116, the allowable-recording-density determining section 106 performs a comparison regarding whether the allowable value Ds obtained in S111 is equal to or larger than the measurement value obtained in S115. As a result of this comparison, where the measurement value is larger than the allowable value Ds (S116: NO), the processing goes to S117. In S117, a measurement value of the test recording area whose density number is larger than that of the measurement value used in S116 by one is obtained among the measurement values of the respective ten densities obtained in S114. Then, returning to S116, the allowable-recording-density determining section 106 performs a comparison between the allowable value Ds and the measurement value thus obtained.

Where the allowable value Ds is equal to or higher than the measurement value of the density (S116: YES), the processing goes to S118. In S118, the allowable-recording-density determining section 106 temporarily saves the density number of the measurement value which has been compared in immediately preceding S116. The recording density for the first surface S1 which relates to the density number having been thus temporarily saved is one of the allowable recording densities Da1C, Da1M, Da1Y, Da1K for the first surface S1 for one of the four colors. In the four test patterns TP1C, TP1M, TP1Y, TP1K shown in the first-area corresponding area R1' in FIG. 4, only the test recording areas are shown in which the measurement values of the respective densities read from the second surface S2 exceed the allowable value Ds. That is, in an example of FIG. 4, since it is judged that the strike-through of the ink is caused in CF1-CF4 for cyan, the allowable recording density Da1C is a density relating to a density number 5. Since it is judged that the strike-through of the ink is caused in MF1-MF5 for magenta, the allowable recording density Da1M is a density relating to a density number 6. Since it is judged that the strike-through of the ink is caused in YF1-YF4 for yellow, the allowable recording density Da1Y is a density relating to a density number 5. Since it is judged that the strike-through of the ink is caused in KF1-KF6 for black, the allowable recording density Da1K is a density relating to a density number 7.

In S119, the allowable-recording-density determining section 106 judges whether the density numbers for all the four colors are temporarily saved or not, that is, whether there is any color whose allowable recording density is not decided or not. Then, where the density numbers for all the four colors are temporarily saved (S119: YES), the processing of S37 is finished. Where one or ones of the density numbers for the four colors is or are not temporarily saved (S119: NO), the colored filter or the light source used by the image sensor 52 is changed in S120 to one relating to the next color. Then, the processing returns to S113.

Returning to FIG. 8, in S38, the allowable-recording-density determining section 106 determines, for the first surface S1, the allowable recording density Dx1 which is common for the four colors. The allowable-recording-density determining section 106 compares the allowable recording densities Da1C, Da1M, Da1Y, Da1K each other for the respective four colors which have been determined in S37 and determines the lowest density as the common allowable recording density Dx1 for the first surface S1. The thus determined common allowable recording density Dx1 for the first surface S1 is stored into the allowable-recording-density storing section 114 in association with the registering number of the sheet.

In S39, the sheet P is switched back. That is, after the trailing end of the sheet P fed from the sheet-feed unit 40 has passed through the branched position of the sheet-feed path and the return path 70, the pair of sheet rollers 34, 35 are reversely rotated, whereby the sheet P is fed to the return path 70. The sheet P fed through the return path 70 is fed into the sheet-feed path 20 at the sheet-feed guide 26. This is a third feeding of the sheet P by the sheet-feed belt 43.

In S40, the reading controlling section 105 controls the image sensor 52 to read from the first surface S1 the four test patterns TP2C, TP2M, TP2Y, TP2K recorded on the second area R2 of the second surface S2. That is, the reading controlling section 105 controls the sheet-feeding controlling section 103 such that the second-area corresponding area R2' of the first surface S1 is disposed at the position below the image sensor 52, and controls the image sensor 52 to be operated to read from the first surface S1 the four test patterns TP2C, TP2M, TP2Y, TP2K recorded on the second area R2 of the second surface S2. Then, the allowable-recording-density determining section 106 determines the allowable recording density for the second surface S1 for each color. A detail of S40 is the same as the processing of S37 explained with reference to FIG. 10, and thus the explanation of which is dispensed with.

In S40, the allowable recording densities Da2C, Da2M, Da2Y, Da2K for the second surface S2 can be obtained for the respective colors. In the four test patterns TP2C, TP2M, TP2Y, TP2K shown in the second-area corresponding area R2' in FIG. 5, only the test recording areas are shown in which the measurement values of the respective densities read from the first surface S1 exceed the allowable value Ds. That is, in an example of FIG. 5, since it is judged that the strike-through of the ink is caused in CS1-CS4 for cyan, the allowable recording density Da2C is the density relating to the density number 5. Since it is judged that the strike-through of the ink is caused in MS1-MS5 for magenta, the allowable recording density Da2M is the density relating to the density number 6. Since it is judged that the strike-through of the ink is caused in YS1-YS4 for yellow, the allowable recording density Da2Y is the density relating to the density number 5. Since it is judged that the strike-through of the ink is caused in KS1-KS6 for black, the allowable recording density Da2K is the density relating to the density number 7.

In S41, the allowable-recording-density determining section 106 determines, for the second surface S2, the allowable recording density Dx2 which is common for the four colors. The allowable-recording-density determining section 106 compares the allowable recording densities Da2C, Da2M, Da2Y, Da2K each other for the respective four colors which have been determined in S40 and determines the lowest density as the common allowable recording density Dx2 for the second surface S2. The thus determined common allowable recording density Dx2 for the second surface S2 is stored into the allowable-recording-density storing section 114 in association with the registering number of the sheet. Then, in S42, the sheet P is discharged onto the sheet-discharge recessed portion 6.

There will be next explained a processing for changing the common allowable recording density Dx1 and the common allowable recording density Dx2 stored respectively in S38 and S41 into the allowable-recording-density storing section 114 with reference to FIG. 11. This changing processing is a processing which may be operated by the user as needed where a desired result has not been obtained when the two-sided recording described below is performed on the basis of the common allowable recording density Dx1 and the common allowable recording density Dx2 stored in the allowable-recording-density storing section 114.

Initially, in S51, where the user inputs one of the registering numbers of the sheet which is desired to be changed by the user, the common allowable recording density Dx1 and the common allowable recording density Dx2 relating to the desired registering number is read from the allowable-recording-density storing section 114.

Then, in S52, an input screen image having the respective input fields of the common allowable recording density Dx1 and the common allowable recording density Dx2 is displayed on the display of the PC 100 or the printer 1. In this time, the value read in S51 is displayed on the input field as a default value. In S53, the processing waits until the common allowable recording density Dx1 is inputted into the input field of the common allowable recording density Dx1 using the input devices of the PC 100 or the printer 1 (e.g., the keyboard, the mouse, the buttons, the touch panel). Then, where the common allowable recording density Dx1 is inputted (S53: YES), the common allowable recording density Dx1 inputted in S53 is stored in S54 into the allowable-recording-density storing section 114 by overwriting in association with the registering number of the common allowable recording density Dx1 which has been read out in S51.

In S55, the processing waits until the common allowable recording density Dx2 is inputted into the input field of the common allowable recording density Dx2 using the input devices of the PC 100 or the printer 1. Then, where the common allowable recording density Dx2 is inputted (S55: YES), the common allowable recording density Dx2 inputted in S55 is stored in S56 into the allowable-recording-density storing section 114 by overwriting in association with the registering number of the common allowable recording density Dx2 which has been read out in S51.

Figure 12:
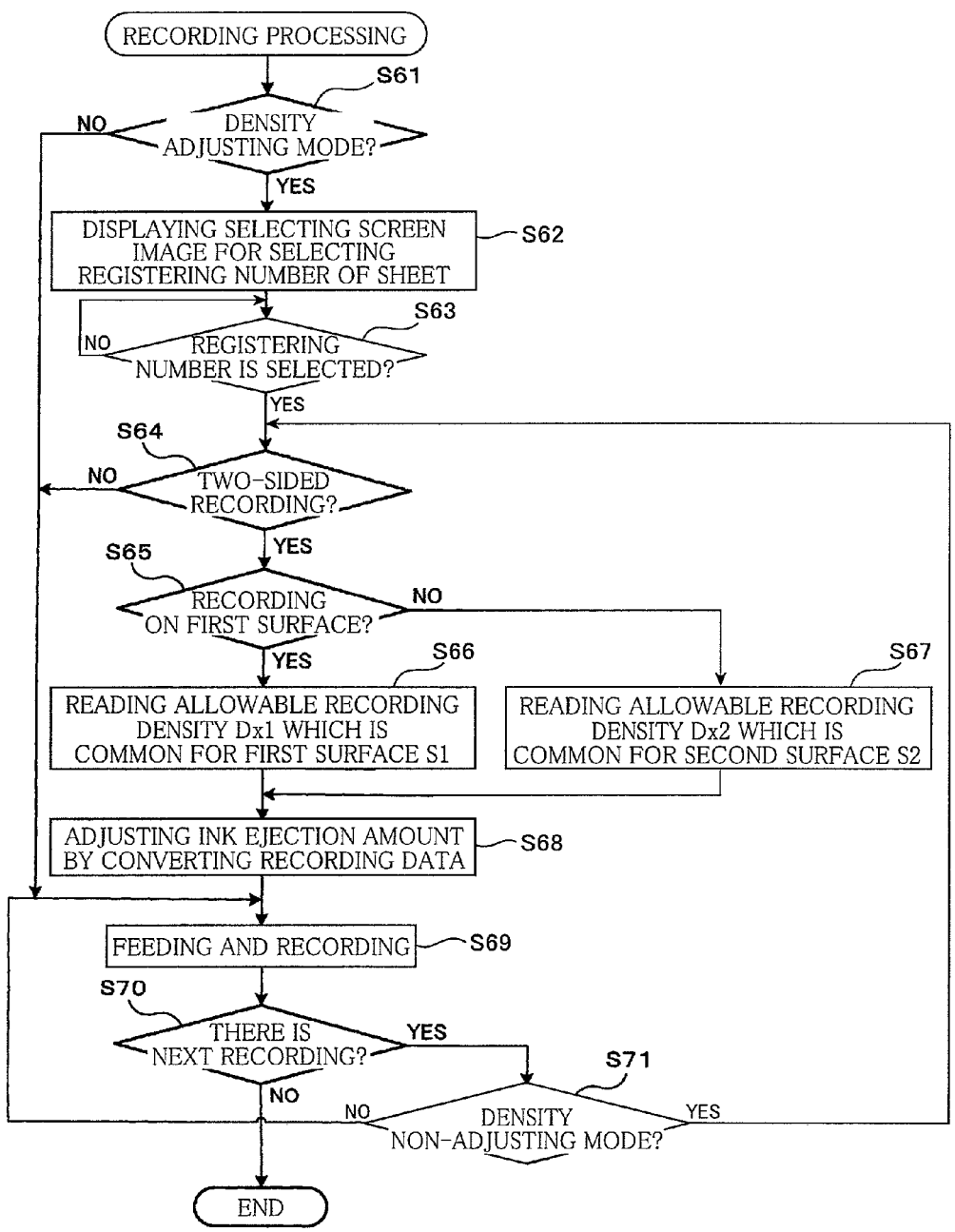
FIG. 12 is a flow-chart indicating a recording processing of a printer in a normal recording mode thereof.

There will be next explained the recording processing of the printer 1 as the present embodiment in the normal recording mode of the printer 1 with reference to FIG. 12.

Initially, in S61, whether the current operating mode of the printer 1 is the density adjusting mode or the density non-adjusting mode is checked. As a result of the check, where the current operating mode is the density adjusting mode (S61: YES), the processing goes to S62. In S62, a selecting screen image for selecting the registering number of the sheet P is displayed on the display of the PC 100. This processing is performed by the control of the control device (including the CPU, the RAM, and so on) of the PC 100 on the basis of information stored in the sheet-information storing section 113 and the driver software of the printer 1 which is installed in the PC 100. In S63, the processing waits until the user selects any one of the registering numbers in the selecting screen image for selecting the registering number using the input devices of the PC 100.

Then, where the registering number is selected (S63:YES), where a current recording relates to the two-sided recording or the one-sided recording is judged in S64 on the basis of a recording command transmitted from the PC 100. Then, the current recording is the two-sided recording (S64: YES), the processing goes to S65. In S65, whether the current recording is the recording on the first surface S1 or the recording on the second surface S2 is judged. Then, where the current recording is the recording on the first surface S1 (S65: YES), the common allowable recording density Dx1 for the first surface S1 which is stored in the allowable-recording-density storing section 114 is read in S66. Where the current recording is the recording on the second surface S2 (S65: NO), the common allowable recording density Dx2 for the second surface S2 which is stored in the allowable-recording-density storing section 114 is read in S67.

In S68, the image-recording controlling section 107 converts the recording data stored in the recording-data storing section 111 such that the recording densities for the first surface S1 and the second surface S2 are equal to or lower than the common allowable recording density Dx1 and the common allowable recording density Dx2 respectively read in S66 and 67. Then, the processing goes to S69. Where the current operating mode is the density non-adjusting mode (S61: NO), and where the current recording is the one-sided recording (S64: NO), the processing goes to S69 without a converting operation like the operation performed in S68.

In S69, the sheet-feeding controlling section 103 controls the motor driver 124 such that the sheet P is supplied from the sheet-supply cassette 24 and fed by the sheet-feed unit 40. Further, the head controlling section 102 controls the four heads 2 via the head driving circuit 121 using the converted or unconverted recording data stored in the recording-data storing section 111 such that the inks are ejected at desired timings. As a result, a desired image is recorded on one of surfaces of the sheet P.

In S70, it is judged whether the recording is performed on the other surface of the sheet which is a surface opposite to the surface subjected to the recording in S69. Where the recording is not performed on the other surface of the sheet (S70: NO), the recording processing in the normal recording mode in FIG. 12 is finished. Where the recording is performed on the other surface of the sheet (S70: YES), the processing goes to S71.

In S71, whether the current operating mode of the printer 1 is the density adjusting mode or the density non-adjusting mode in the normal recording mode is checked. As a result of the check, where the current operating mode is the density adjusting mode (S71: YES), the processing returns to S64.

Where the current operating mode is the density non-adjusting mode (S71: NO), the processing returns to S69.

As described above, according to the present embodiment, densities which are less likely to cause the strike-through of the ink can be speedily determined respectively for the first surface S1 and the second surface S2 of the sheet P. Thus, even where properties (e.g., easiness of soakage of the ink) are different between the first surface S1 and the second surface S2 of the sheet P, the strike-through can be restrained for each of the first surface S1 and the second surface S2 in the two-sided recording. In particular, the strike-through can be effectively restrained for the ink-jet printer 1 as the present embodiment including the ink-jet heads 2 as recording heads configured to eject ink droplets.

Further, as shown in FIGS. 3 and 4, since the density of each of the test patterns is gradually changed in the direction perpendicular to the feeding direction, the test patterns can be read for a relatively short time when compared with a case in which the density of each test pattern is changed in the feeding direction.

Further, since the four test patterns having the respective different colors on each surface are arranged in the feeding direction, the test patterns can be speedily read even in a case where the image sensor 52 employs a switching system of the colored filter or the light source.

Furthermore, in the present embodiment, the allowable recording densities Dx1, Dx2 each of which is common for the four colors are separately determined respectively for the first surface S1 and the second surface S2 using the result of the reading of the four test patterns. As thus described, the allowable recording density is common for the four colors, whereby change in an image quality (e.g., a color) can be restrained. In particular, in the present embodiment, since the allowable recording densities are determined for the respective four colors, and then the lowest density among these four allowable recording densities is determined as the common allowable recording density, the strike-through of the ink is less likely to be caused for any color in color recording.

Further, since the allowable value Ds of the density which relates to the strike-through and which is stored in the allowable-value storing section 112 is rewritable, the allowable recording density can be adjusted in response to a request of the user.

In addition, in the present embodiment, since the four test patterns TP1C, TP1M, TP1Y, TP1K and the four test patterns TP2C, TP2M, TP2Y, TP2K are disposed so as to be axisymmetric with each other for the respective four colors with respect to the central axis C of the sheet P which extends in the direction perpendicular to the feeding direction, readings of the two test patterns of the same color can be performed for each surface at the same timing, thereby facilitating the control of the image sensor 52.

Further, since the allowable-recording-density determining section 106 determines each of the allowable recording densities Da1C, Da1M, Da1Y, Da1K, Da2C, Da2M, Da2Y, Da2K for the four colors as one of the densities each corresponds to one of the density numbers 1-10, the calculation performed by the allowable-recording-density determining section 106 is simplified, whereby the determination of the allowable recording density can be easily performed. In this time, each of the allowable recording densities Da1C, Da1M, Da1Y, Da1K, Da2C, Da2M, Da2Y, Da2K is determined so as to be the same as the density of the one of the ten test recording areas of the test pattern for each color, which one has the measurement value indicating the highest density equal to or lower than the allowable value Ds, the allowable recording density can be set as high as possible.

Further, the printer 1 as the present embodiment includes the allowable-recording-density storing section 114 configured to store the common allowable recording density Dx1 and the common allowable recording density Dx2 each in association with the identifying number(s) of the sheet(s) P of one or the plurality of types. Thus, where the sheet P of the same type as the previous one is used to record the image, there is no need to determine the allowable recording density again, thereby effectively recording the image on the sheet P. Further, since the common allowable recording density Dx1 and the common allowable recording density Dx2 stored in the allowable-recording-density storing section 114 are rewritable, there is an advantage in which the recording density can be adjusted in response to the request of the user.

While the embodiment of the present invention has been described above, it is to be understood that the invention is not limited to the details of the illustrated embodiment, but may be embodied with various changes and modifications, which may occur to those skilled in the art, without departing from the spirit and scope of the invention defined in the attached claims. For example, the feeding mechanism performs belt feeding of the sheet in the above-described embodiment, but the feeding mechanism may perform drum feeding or guide feeding.

The allowable-recording-density storing section 114 determines and stores the common allowable recording density Dx1 and the common allowable recording density Dx2 in the present embodiment, but may store the allowable recording densities Da1C, Da1M, Da1Y, Da1K, Da2C, Da2M, Da2Y, Da2K for the respective colors. Where the allowable-recording-density storing section 114 is thus configured, the image-recording controlling section 107 controls the heads 2 to record the image in the two-sided recording (the density adjusting mode) in the normal recording mode such that the recording density of the image on the sheet P is equal to or lower than the allowable recording density determined for each color. Further, the printer 1 may be configured such that the test pattern of only one of the four colors is formed on each surface of the sheet P, and the allowable recording density determined for the test pattern is set as the allowable recording density which is common for the four colors.

A position of the image sensor 52 is not limited to a position shown in FIG. 1. For example, the printer 1 may be configured such that the image sensor 52 is disposed in an area surrounded with the sheet-feed belt 43 in which a through hole is formed, and the image sensor 52 reads an inner surface of the sheet P which faces to the image sensor 52. Where the printer 1 is thus configured, a number of the feeding of the sheet P to the sheet-feed unit 40 in the allowable recording density determining mode can be made two.

In the above-described embodiment, the allowable-recording-density determining section 106 determines for each color the allowable recording density Da1 and the allowable recording density Da2 as the densities each corresponding to one of the density numbers 1-10. However, the allowable-recording-density determining section 106 may determine for each color the allowable recording density Da1 and the allowable recording density Da2 as densities other than the densities each corresponding to the one of the density numbers 1-10. For example, in addition to the comparison regarding whether the allowable value Ds is equal to or higher than the measurement value of the density in S116 explained with reference to FIG. 10, a difference between the allowable value Ds and the measurement values may be obtained to obtain the allowable recording density Da1 and the allowable recording density Da2 using the difference by extrapolation or interpolation from a plurality of the measurement values. Where the printer 1 is thus configured, the recording density which is less likely to cause the strike-through can be precisely determined. As a result, the image quality can be improved.

Further, in the above-described embodiment, the allowable recording density Da1 and the allowable recording density Da2 are the same as the density of the one of the ten test recording areas of each test pattern for each color, which one has the measurement value indicating the highest density equal to or lower than the allowable value Ds. However, each of the allowable recording density Da1 and the allowable recording density Da2 may be a density lower than the density of the test recording area having the measurement value indicating the highest density.

Further, in the above-described embodiment, the above-described four test patterns are recorded on the generally half area of the sheet, but the test patterns may have any form as long as the test patterns formed on the first surface S1 and the second surface S2 are not opposed to each other. Further, the ten test recording areas may not be arranged such that the density becomes gradually larger.

It is noted that, in the above-described embodiment, the allowable-recording-density determining section 106 determines the allowable recording densities by comparing the allowable value Ds stored in the allowable-value storing section 112 and the measurement value of the density of each test recording area, but the present invention is not limited to this configuration. For example, the allowable-recording-density determining section 106 may specify, by referring the measurement value of the density of each test recording area, one of the test recording areas which cause the strike-through of the ink in the smallest degree to determine the allowable recording densities on the basis of the specified density of the test recording area. For example, where, for cyan, measurement values indicating that the strike-through of the ink is caused has been detected on CF1-CF4 while measurement values indicating that the strike-through of the ink is not caused at all has been detected on CF5-CF10, the test recording areas which cause the strike-through of the ink in the smallest degree are CF5-CF10, and the allowable recording density Da1C can be set to the density corresponding to the density number 5 as the recording density which can prevent the strike-through of the ink while restraining lowering of the recording quality. Likewise, the allowable recording densities can be determined for magenta, yellow, and black, and the lowest density among the determined allowable recording densities is set as the allowable recording density Dx1 which is common for the colors. In this configuration, the two-sided recording in which the strike-through of the ink is caused in a smaller degree can be performed without setting of the allowable value Ds in advance. Further, where, for cyan, the strike-through of the ink is caused on CF1-CF4 and is not caused on CF5-CF10, CF5 is set as the allowable recording density, but, instead of this, CF4 whose measurement value is a value in which a degree of the strike-through is the smallest among measurement values in which the strike-through of the ink has been detected may be set as the allowable recording density. Where the printer 1 is thus configured, the recording quality can be improved while allowing the generation of the strike-through of the ink. As thus described, the present invention can be embodied such that where the user selects the two-sided recording, the allowable-recording-density determining section 106 determines the allowable recording density without referring the allowable value.

Further, in the above-described embodiment, the allowable-recording-density determining section 106 compares the allowable value Ds with the measurement value of each test recording area, and where the allowable value Ds is equal to or higher than the measurement value of the density, the density of the test recording area having the compared measurement value is employed as the allowable recording density for each color, but the present invention is not limited to this configuration. For example, the printer 1 may be configured such that the allowable-recording-density determining section 106 compares the allowable value Ds with the measurement value of each test recording area, and selects one of the measurement values of the respective test recording areas, which one is the nearest to the allowable value Ds (i.e., an absolute value of a difference between the measurement value of each test recording area and the allowable value Ds is the smallest), whereby the density of the test recording area of the measurement value is employed as the allowable recording density for each color. In this case, the measurement value of the density of each test recording area may exceed the allowable value Ds, but it is restrained that the recording density of the image is lowered more than necessary. Thus, the lowering of the image quality can be restrained.

Further, in the above-described embodiment, the allowable-recording-density determining section 106 determines the common allowable recording density Dx1 for the first surface S1 and the common allowable recording density Dx2 for the second surface S2, and record the image on the first surface S1 at the density equal to or lower than the common allowable recording density Dx1 and record the image on the second surface S2 at the density equal to or lower than the common allowable recording density Dx2, but the present invention is not limited to this configuration. For example, the printer 1 may be configured such that the allowable-recording-density determining section 106 determines the common allowable recording density Dx1 for the first surface S1 and the common allowable recording density Dx2 for the second surface S2 and compares the common allowable recording density Dx1 and the common allowable recording density Dx2, whereby the allowable recording density having a lower value of the density is employed as the allowable recording density which is common for the first surface S1 and the second surface S2. Where the printer 1 is thus configured, it is possible to determine a recording density which is less likely to cause the strike-through of the ink.

Further, the present invention is applicable not only to the ink-jet printer 1 having the ink-jet heads 2 but also image recording apparatuses of other types such as a printer having a thermal head which thermally transfers the ink onto the sheet P.

What is claimed is:

1. An image recording apparatus configured to respectively record images on opposite surfaces of a recording medium having a sheet-like shape, comprising:
    a recording head configured to record an image on the recording medium;
    a feeding mechanism configured to feed the recording medium in a first-surface-face-up feeding processing such that the recording medium passes through a position facing to the recording head in a state in which a first surface of the recording medium faces toward the recording head, wherein the feeding mechanism is configured to feed the recording medium in a second-surface-face-up feeding processing executed subsequent to the first-surface-face-up feeding processing such that the recording medium passes through the position facing to the recording head in a state in which a second surface of the recording medium opposite to the first surface faces toward the recording head;
    an image reading portion configured to read the image recorded on the recording medium;
    a test recording controller configured to control the recording head such that a test pattern including a plurality of test recording areas whose densities are different from each other is recorded on a first area which is a part of the first surface of the recording medium, and a test pattern including a plurality of test recording areas whose densities are different from each other is recorded on a second area which is a part of the second surface of the recording medium and which is an area other than a first-area corresponding area as a part of the second surface, the part corresponding to the first area of the first surface;
    a test pattern reading section configured control the image reading portion to read the test pattern recorded on the first area from the second surface by controlling the feeding mechanism such that the first-area corresponding area of the second surface faces to the image reading portion, and configured to control the image reading portion to read the test pattern recorded on the second area from the first surface by controlling the feeding mechanism such that a second-area corresponding area as a part of the first surface which corresponds to the second area of the second surface faces to the image reading portion;
    a recording-and-reading performing section configured to:
        control the test recording controller to perform a test pattern recording on the first surface in the first-surface-face-up feeding processing,
        control the test recording controller to perform a test pattern recording on the second surface and to control the test pattern reading section to read the test pattern recorded on the first surface in the second-surface-face-up feeding processing, and
        control the test pattern reading section to read the test pattern recorded on the second surface in the first-surface-face-up feeding processing;
    a determining section configured to determine an allowable recording density of a recording density for the first surface and an allowable recording density of a recording density for the second surface on the basis of a read value indicating the density relating to the first area which has been read by the test pattern reading section and a read value indicating the density relating to the second area which has been read by the test pattern reading section; and
    an image recording controller configured to control the recording head such that where the images are respectively recorded on the opposite surfaces of the recording medium, the image is recorded on the first surface at a density equal to or lower than the allowable recording density for the first surface and the image is recorded on the second surface at a density equal to or lower than the allowable recording density for the second surface.

2. The image recording apparatus according to claim 1, further comprising an allowable-value storing section configured to store an allowable value of a density relating to a strike-through of the image recorded on the recording medium,
    wherein the determining section is configured to determine the allowable recording density for the first surface and the allowable recording density for the second surface by comparing the allowable value stored in the allowable-value storing section and read values of the respective densities of the plurality of test recording areas of the test pattern read by the test pattern reading section.

3. The image recording apparatus according to claim 2, wherein the determining section is configured to determine (a) the allowable recording density for the first surface in which a density obtained when the image recorded on the first surface is read from the second surface is equal to or lower than the allowable value and (b) the allowable recording density for the second surface in which a density obtained when the image recorded on the second surface is read from the first surface is equal to or lower than the allowable value by comparing the allowable value stored in the allowable-value storing section and the read values of the respective densities of the plurality of test recording areas of the test pattern read by the test pattern reading section.

4. The image recording apparatus according to claim 2, wherein the determining section is configured to obtain the allowable recording density by comparing the allowable value and the read value for each of colors different from each other, and determine, as the allowable recording density which is common for the plurality of colors, among a plurality of allowable recording densities for the respective colors.

5. The image recording apparatus according to claim 2, wherein the allowable value stored in the allowable-value storing section is rewritable.

6. The image recording apparatus according to claim 2, wherein the allowable recording density determined by the determining section is one of densities of respective read values of the plurality of test recording areas, which one is equal to or lower than the allowable value and is the highest density of the respective read values of the plurality of test recording areas.

7. The image recording apparatus according to claim 2, further comprising a density storing section configured to store the allowable recording density for the first surface and the allowable recording density for the second surface in association with an identifying number of the recording medium.

8. The image recording apparatus according to claim 7, wherein the allowable recording density stored in the density storing section is rewritable.

9. The image recording apparatus according to claim 1, wherein the test recording controller controls the recording head such that respective densities of the plurality of test recording areas changes in the first area and the second area in a direction perpendicular to a feeding direction in which the recording medium is fed by the feeding mechanism.

10. The image recording apparatus according to claim 1, wherein the test recording controller controls the recording head such that the plurality of test recording areas are recorded on the first area and the second area in colors different from each other.

11. The image recording apparatus according to claim 10, wherein the test recording controller is configured to control the recording head such that the plurality of test recording areas recorded in the colors different from each other are arranged in the feeding direction in the first area and the second area.

12. The image recording apparatus according to claim 10, wherein the colors different from each other are cyan, magenta, yellow, and black.

13. The image recording apparatus according to claim 10, wherein the determining section is configured to determine the allowable recording density which is common for the plurality of colors on the basis of a result of reading relating to the test pattern including the plurality of test recording areas recorded in the colors different from each other.

14. The image recording apparatus according to claim 1, wherein the test pattern recorded on the first area and the test pattern recorded on the second area are disposed so as to be axisymmetric with each other with respect to a central axis of the recording medium extending in a direction perpendicular to a feeding direction in which the recording medium is fed by the feeding mechanism at a position facing to the recording head.

15. The image recording apparatus according to claim 1, wherein the allowable recording density determined by the determining section is a density which is the same as that of any of the plurality of test recording areas of the test pattern.

16. The image recording apparatus according to claim 1, wherein the recording head is provided by an ink-jet head.

17. The image recording apparatus according to claim 1, wherein the test recording controller determines a size of the test pattern on the basis of a size of the recording medium,
wherein a length of the test pattern in a feeding direction of the recording medium is smaller than a half of a length of the recording medium in the feeding direction, and
wherein a length of the test pattern in a direction perpendicular to the feeding direction of the recording medium is smaller than a length of the recording medium in the direction perpendicular to the feeding direction.

\* \* \* \* \*